Figure 3:
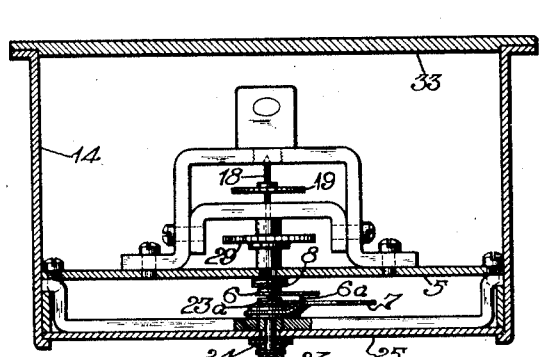

May 3, 1927.

H. P. SLEEPER

TEMPERATURE INDICATING DEVICE

Filed April 23, 1920

1,626,633

WITNESSES:
J. B. Merrill
J. E. Foster

INVENTOR
Harvey P. Sleeper
BY
Wesley L. Carr
ATTORNEY

Patented May 3, 1927.

1,626,633

UNITED STATES PATENT OFFICE.

HARVEY P. SLEEPER, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE-INDICATING DEVICE.

Application filed April 23, 1920. Serial No. 376,046.

My invention relates to temperature-indicating devices and particularly to temperature-indicating and recording devices for electrical apparatus.

One object of my invention is to provide a temperature-indicating device that shall have means for indicating the instantaneous and the maximum temperatures attained and that shall also have means for indicating the recurrence of a predetermined temperature in a translating device, such as a transformer.

Another object of my invention is to provide a device of the above-indicated character, that may be employed in connection with out-door-pole-mounted transformers and that shall have the indicating mechanism thereof so disposed as to be visible from the street at the base of the pole.

Another object of my invention is to provide an indicating device, of the above-indicated character, that shall be simple and economical in construction, easily accessible for purposes of adjustment and reliable in its operation.

My copending application filed April 7, 1920, Serial No. 371,939, discloses a temperature-indicating device that indicates the instantaneous and the maximum temperatures attained in the translating device and that also indicates the recurrence of a plurality of predetermined maximum temperatures in the translating device. The device therein disclosed embodies indicating means, visible from the street, that indicate the recurrence of predetermined temperatures in a pole-mounted transformer, and indicating means for indicating the instantaneous and the maximum temperature attained, the latter means of which, however, are not visible from the street below the transformer. My present invention embodies a simple device wherein the indicating means are disposed to so co-operate with a single dial as to render all the indications visible from the street below the transformer in which the temperature device may be disposed.

In practicing my invention, I provide a spirally-wound bimetallic member that may be disposed in the insulating oil of a transformer and an indicating mechanism that is actuated by the bimetallic member and that may be disposed outside of the casing of the transformer. The indicating mechanism comprises a stationary dial, that is calibrated in centigrade degrees, and three movable indicating pointers. One pointer is directly actuated by the bimetallic member, through a shaft and gear wheels of suitable ratio, to indicate the temperature of the transformer directly on the dial. The second, or maximum, pointer is actuated by the former pointer and remains in the extreme position of its movement. Adjusting means are provided to reset the maximum pointer. The third pointer is actuated each time the temperature of the transformer attains or exceeds a predetermined value. A hood, that is employed to enclose the indicating mechanism, comprises a window adjacent the dial and the indicating pointers, and a door at the rear of the indicating mechanism to permit access thereto for adjusting the mechanism to indicate the recurrence of a temperature of certain value. The bimetallic member and a shaft, that is controlled thereby for actuating the indicating mechanism, are disposed in a casing that extends through the cover of the transformer casing into the oil. The indicating mechanism and the hood that encloses it are so disposed on the casing of the bimetallic elements as to form an angle such as will permit visibility of the indicating dial and the pointers from the street at the base of a pole on which the transformer may be counted.

Figure 4:
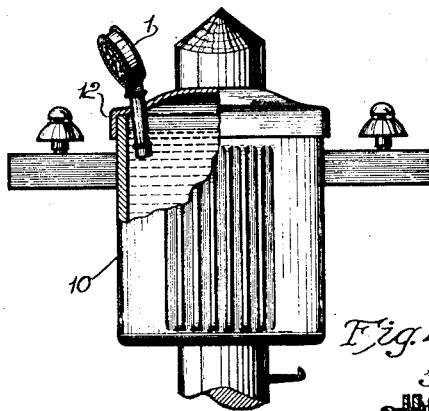
Figure 1:
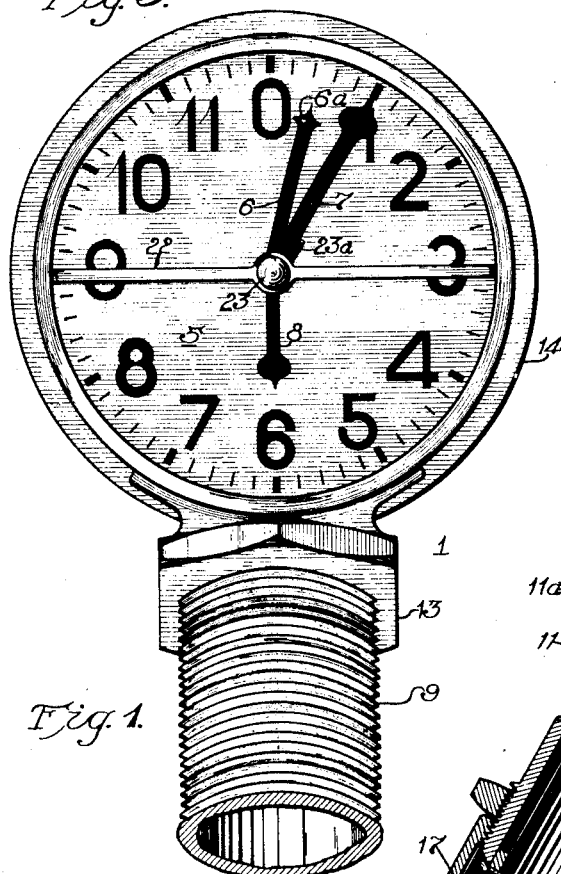
Figure 2:
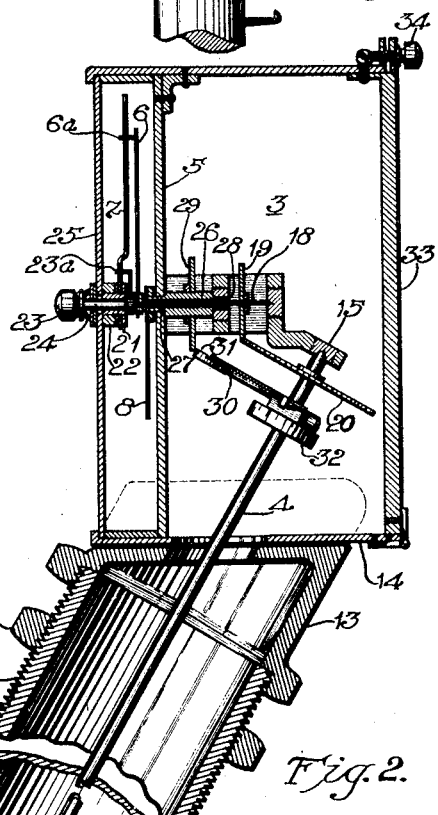

In the accompanying drawings, Figure 1 is a front elevational view of the device embodying my invention; Fig. 2 is a side view, partially in elevation and partially in section, of the device shown in Fig. 1; Fig. 3 is a top view, partially in elevation and partially in section, of the device shown in Fig. 1, and Fig. 4 is a schematic view, partially in section and partially in elevation, of a pole-mounted transformer illustrating the disposition therein of the device shown in Fig. 1.

A temperature-indicating device 1 comprises a spirally-wound bimetallic member 2, an indicating mechanism 3 and a shaft 4 that is controlled by the bimetallic member 2 to actuate the mechanism 3. The indicating mechanism 3 comprises a stationary dial member 5 that is calibrated in centigrade degrees, an indicating pointer 6 for indicating the instantaneous temperature, a maximum pointer 7, that is actuated by a projection 6ª on the pointer 6 and that is adapted to remain in the extreme position of its movement, and a pointer 8 for indicating the recurrence of a predetermined temperature.

The bimetallic member 2 and the shaft 4 are disposed in a casing 9 that may be immersed in the oil of a transformer 10. The casing 9 is threaded along a portion 11 thereof in order that the casing 9 may be secured to the cover 12 of the transformer casing by a lock nut 11ª. A cap 13 is adapted to be threaded upon the portion 11 of the casing 9 and is employed to support a hood 14 for enclosing the indicating mechanism 3 and to co-operate with the lock nut 11ª in securing the casing 9 to the transformer casing. The shaft 4 extends into the hood 14 and is supported between a bearing 15 therein and a bearing 16 disposed in the casing 9 adjacent the bimetallic member 2. One end of the bimetallic member 2 is secured to the shaft 4, and the other end is secured to a block 17 that is adjustably mounted on the casing 9. The pointer 6, of the indicating mechanism, is mounted on a shaft 18 that also has a gear wheel 19 mounted thereon. The gear wheel 19 engages a gear wheel 20 that is mounted on the shaft 4 and is controlled thereby to actuate the indicating pointer 6. The maximum pointer 7 is mounted on a bearing 21 that is supported by a bridge arm 22 disposed adjacent, and secured to, the indicating dial 5. An adjusting member 23 is provided to reset the maximum pointer 7 by means of a lateral projection 23ª. A small spring washer 24 co-operates with the adjusting member 23 and a glass window 25 to effect sufficient friction between the bearing 21 that supports the maximum pointer 7 and the bridge arm 22 to preclude any movement of the maximum pointer 7 that might be caused by the force of gravity or by vibration in the indicating device. The maximum pointer 7, therefore, may be actuated by the indicating pointer 6 only. The recurrence-indicating pointer 8 is mounted on a sleeve member 26 that is disposed around the shaft 18 and that is supported between two bearings 27 and 28. A ratchet wheel 29 is axially mounted on the sleeve member 26 and is adapted to be actuated by a pawl member 30 that is adjustably mounted on the shaft 4. The pawl member 30 has a pivoted portion 31 at the operating end thereof that is adapted to so engage the ratchet wheel 29 as to actuate it in one direction only. A member provided with a scale 32 is mounted on the shaft 4 adjacent the pawl member 30 and indicates settings for various temperatures at which the pawl-and-ratchet mechanism may be arranged to operate for actuating the temperature-recurrence pointer 8. A door 33, that is held closed by a thumb screw 34, is disposed adjacent the mechanism 3 to permit access thereto for adjusting the position of the pawl member 30 on the shaft 4.

The casing 9, that surrounds the bimetallic element and the shaft 4, and the hood 14, that encloses the indicating mechanism 3, are so disposed with respect to each other as to form an obtuse angle in order that the indicating dial 5 of the device may be visible from the street at the base of a pole that supports a transformer in which the indicating device is disposed. Fig. 4 illustrates the disposition of an indicating device 1 in a transformer 10 that is mounted on a pole.

While I have shown a preferred form of device embodying my invention, I do not limit it to the structure illustrated, as various modifications may be made therein within the spirit and scope of the invention as set forth in the appended claims.

I claim as my invention:

1. A temperature-indicating device for a translating device, comprising a bimetallic member, a rod member actuated thereby, a casing for the bimetallic member and the rod member adapted to be immersed in the medium surrounding the translating device, an indicating mechanism disposed outside of the casing and comprising a dial member, a pointer, gears connecting said pointer to the rod member, said pointer indicating the instantaneous temperature of the translating device, a maximum pointer actuated by the temperature-indicating pointer to indicate maximum temperatures attained, a recurrence pointer actuated upon the occurrence of a predetermined temperature in the translating device, and means adjustably mounted upon the rod and comprising a pawl and ratchet device, for actuating the recurrence pointer at predetermined temperatures.

2. A temperature-indicating device for a transformer, comprising a heat-responsive element adapted to be thermally influenced by the temperature of the transformer, a rod member controlled by the heat-responsive element and an indicating mechanism disposed outside of the heat zone occupied by the heat-responsive element and comprising a single indicating dial and scale, a pointer, a gear wheel connecting the pointer and the rod member, a maximum pointer actuated by the rod-controlled pointer to indicate the maximum travel thereof, means for resetting the maximum pointer, a third pointer actuated only upon the attaining of a predetermined temperature within the transformer and means adjustably mounted upon the rod and having a pawl and ratchet connection with the pointer for actuating the same at the predetermined temperature, all of said pointers being mounted concentrically.

3. A temperature-indicating device comprising a thermal-responsive element and means controlled thereby, an indicating means comprising a single-scale member and a plurality of concentrically mounted movable indicating members embodying an instantaneous temperature indicating member, a gear wheel connection between the instantaneous-temperature-indicating member and the thermal element, a maximum-temperature indicating member actuated by the first-named indicating member, and an indicating member for indicating the recurrence of a predetermined temperature, a pawl-and-ratchet mechanism for actuating the recurrence-indicating member embodying a ratchet wheel directly connected to the indicating member and a pawl member adjustably mounted on the thermal-element-controlled means adapted to actuate the ratchet wheel in one direction only at a predetermined temperature.

In testimony whereof, I have hereunto subscribed my name this 12th day of April, 1920.

HARVEY P. SLEEPER.